United States Patent
Enjalbert

(10) Patent No.: US 10,488,430 B2
(45) Date of Patent: Nov. 26, 2019

(54) STICTION DETECTION AND RECOVERY IN A MICRO-ELECTRO-MECHANICAL SYSTEM DEVICE

(71) Applicant: NXP USA, INC., Austin, TX (US)

(72) Inventor: Jerome Romain Enjalbert, Tournefeuille (FR)

(73) Assignee: NXP USA, Inc., Austin, TX (US)

( * ) Notice: Subject to any disclaimer, the term of this patent is extended or adjusted under 35 U.S.C. 154(b) by 129 days.

(21) Appl. No.: 15/727,989

(22) Filed: Oct. 9, 2017

(65) Prior Publication Data
US 2018/0113147 A1 Apr. 26, 2018

(30) Foreign Application Priority Data
Oct. 26, 2016 (EP) .................................... 16306404

(51) Int. Cl.
- *G01P 21/00* (2006.01)
- *G01P 15/125* (2006.01)
- *G01P 15/18* (2013.01)
- *G01P 15/08* (2006.01)

(52) U.S. Cl.
CPC ............ *G01P 21/00* (2013.01); *G01P 15/125* (2013.01); *G01P 15/18* (2013.01); *G01P 2015/0868* (2013.01); *G01P 2015/0874* (2013.01)

(58) Field of Classification Search
CPC ........ G01P 21/00; G01P 15/125; G01P 15/18; G01P 2015/0868; G01P 2015/0871; G01P 2015/0874; G01N 19/02; B81B 3/0016; H02N 1/006; H02N 99/00
See application file for complete search history.

(56) References Cited

U.S. PATENT DOCUMENTS

| | | | | |
|---|---|---|---|---|
| 2009/0320557 | A1* | 12/2009 | Sammoura | B81C 99/0045 73/9 |
| 2014/0217929 | A1* | 8/2014 | Lin | H02N 1/006 318/116 |
| 2014/0311242 | A1* | 10/2014 | Lee | G01C 19/5783 73/504.12 |
| 2015/0002982 | A1* | 1/2015 | Cazzaniga | B81C 1/00968 361/233 |
| 2015/0096377 | A1* | 4/2015 | Membretti | G01P 15/125 73/514.32 |
| 2016/0274141 | A1* | 9/2016 | Enjalbert | G01P 15/125 |
| 2017/0003315 | A1* | 1/2017 | Enjalbert | G01P 21/00 |

FOREIGN PATENT DOCUMENTS

EP 2805913 A1 11/2014

* cited by examiner

*Primary Examiner* — Harshad R Patel
*Assistant Examiner* — Nigel H Plumb
(74) *Attorney, Agent, or Firm* — Charlene R. Jacobsen

(57) ABSTRACT

A method for testing a multi-axis micro-electro-mechanical system(MEMS) acceleration sensor includes applying a first voltage to a first-axis excitation plate to move a first proof mass in contact with a proof mass stop. A second voltage is applied to a second-axis excitation plate while maintaining the first voltage to the first-axis excitation plate, to move the first proof mass in a direction orthogonal to the first-axis while in contact with the proof mass stop A reference voltage is applied to the first-axis excitation plate and a determination is made whether an output voltage of the MEMS device is higher than a threshold voltage. If the output voltage is higher than the threshold voltage ten stiction is detected and stiction recovery may therefore be preformed.

20 Claims, 8 Drawing Sheets

STICTION DETECTION AND RECOVERY IN A MICRO-ELECTRO-MECHANICAL SYSTEM DEVICE

CROSS-REFERENCE TO RELATED APPLICATIONS

This application claims the priority under 35 U.S.C. § 119 of European patent application no. 16306404.1, filed Oct. 26, 2016 the contents of which are incorporated by reference herein.

BACKGROUND

Field

This disclosure relates generally to micro-electro-mechanical systems and more specifically to stiction detection and recovery in a micro-electro-mechanical system (MEMS) device.

Related Art

Micro-electro-mechanical systems (MEMS) is a technology for making very small mechanical devices using integrated circuit processing technology. The small mechanical devices may include sensors for use in a variety of applications, such as pressure sensors and acceleration sensors. Stiction is an industry-wide problem in MEMS sensors, and can be a significant contributor to yield loss. Stiction is generally determined to result from the attraction of two surfaces for various reasons such as electrostatic attraction, Van der Wals, Capillary Hydrogen Bonding, friction, etc. Stiction results in the two surfaces sticking together, or bonding, so that a large force is required to separate them. Stiction can occur at manufacturing, or later in the field. Physical phenomenon causing stiction are numerous, but not well understood or controlled. Anti-stiction coatings are effective, but can wear out due to repetitive shocks, humidity, surface roughness, charging, etc. Sensitive, low-G sensors are especially vulnerable because the restoring force of the spring is low and cannot overcome a strong adhesion force. At the final test stage of production, it is highly desirable to be able to screen products, but this may not be possible in some package designs where the MEMS element is not directly accessible with test equipment. In the field, it is desirable in some high reliability applications to provide the capability to detect stiction and even recover from it.

BRIEF DESCRIPTION OF THE DRAWINGS

The present invention is illustrated by way of example and is not limited by the accompanying figures, in which like references indicate the same or similar elements between the various embodiments. Elements in the figures are illustrated for simplicity and clarity and have not necessarily been drawn to scale.

DETAILED DESCRIPTION

Figure 1:
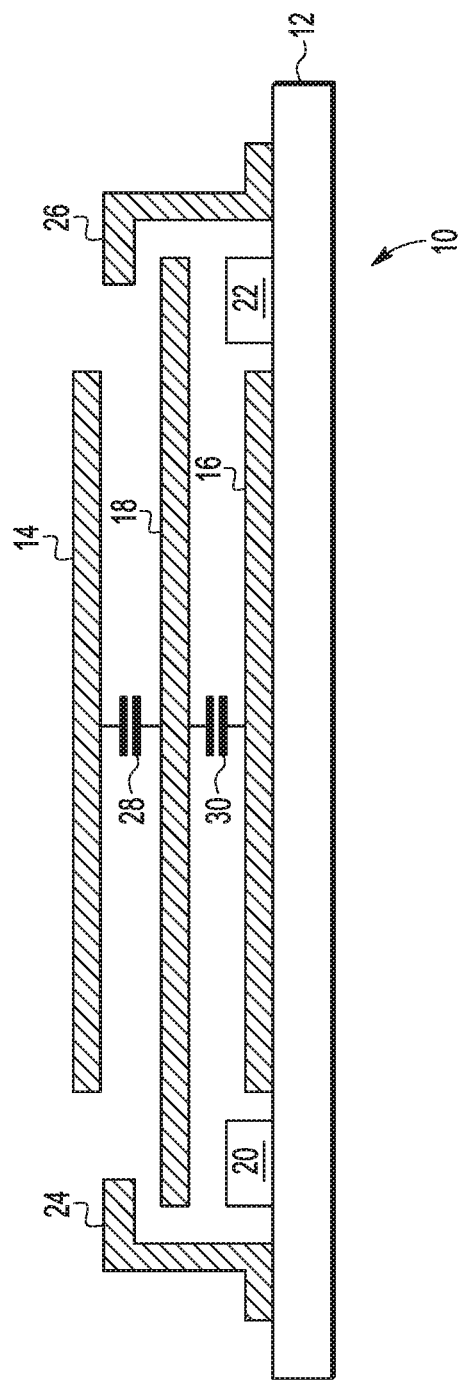
FIG. 1 illustrates a simplified cross-sectional view of a multi-axis, single proof mass, micro-electro-mechanical system (MEMS) device in accordance with an embodiment.

Generally, there is provided, a method for detecting stiction in a multi-axis, single proof mass, MEMS sensor device. In one embodiment, the MEMS sensor device is for sensing acceleration. The method includes applying a first voltage to a first-axis excitation plate to move a first proof mass in contact with a proof mass stop. A second voltage is applied to a second-axis excitation plate while maintaining the first voltage to the first-axis excitation plate. The application of the second voltage is intended to cause the first proof mass to move in a direction orthogonal to the first-axis while in contact with the proof mass stop. A reference voltage is applied to the first-axis excitation plate. An output voltage of the MEMS device is detected. If the output voltage is higher than a threshold voltage then stiction is detected. In another embodiment, stiction recovery is performed. In the stiction recovery method, it is determined which proof mass stop of a plurality of proof mass stops against which the first proof mass is stuck. The first voltage is applied to an excitation plate in a first-axis direction opposite the proof mass stop the first proof mass is stuck against to try to pull the proof mass away from the stop. the second voltage is applied to an excitation plate in a second-axis direction orthogonal to the first-axis direction. The second voltage is ramped up and down to cause a lateral movement of the proof mass to help release the proof mass from the stop. Then it is determined if the first proof mass is still stuck against the proof mass stop. The method for stiction recovery may be used by devices used by high reliability applications.

In one embodiment, there is provided, a method for testing a multi-axis, micro-electro-mechanical system (MEMS) acceleration sensor, the method comprising: applying a first voltage to a first-axis excitation plate to move a first proof mass in contact with a proof mass stop; applying a second voltage to a second-axis excitation plate while maintaining the first voltage to the first-axis excitation plate, to move the first proof mass in a direction orthogonal to the first-axis while in contact with the proof mass stop; applying a reference voltage to the first-axis excitation plate; and detecting if an output voltage of the MEMS device is higher than a threshold voltage. Applying the second voltage may further comprise alternately increasing and decreasing the second voltage to the second-axis excitation plate. The method for testing may further comprise detecting that the first proof mass is stuck against the proof mass stop when the output voltage is higher than the threshold. The method for testing may further comprise recovering the first proof mass from being stuck, wherein recovering further comprising: determining which proof mass stop of a plurality of proof mass stops the first proof mass is stuck against; applying the first voltage to an excitation plate in a first-axis direction opposite the proof mass stop the first proof mass is stuck against; applying the second voltage to an excitation plate in a second-axis direction orthogonal to the first-axis direction; and detecting if the first proof mass is still stuck against the proof mass stop. The MEMS device may be a three-axis, single proof mass, MEMS device. The first voltage and the second voltage may each be higher than the reference voltage. The method may further comprise alternating the steps of applying the first voltage and applying the reference voltage. The method may further comprise a second proof mass arranged with the first proof mass to provide a differential output voltage. The method may be performed during manufacture of the MEMS device.

In another embodiment, there is provided, a method for detecting and recovering from stiction in a multi-axis, single proof mass, micro-electro-mechanical system (MEMS) device, the method comprising: detecting that an output voltage from a first-axis direction of the MEMS device has been above a predetermined threshold voltage for a period of time greater than a predetermined time; applying a first voltage to a first first-axis excitation plate, wherein the first first-axis excitation plate is determined based on the saturation output voltage; applying a second voltage to a first second-axis excitation plate while maintaining the first voltage to the first first-axis excitation plate, to move a first proof mass in a direction orthogonal to the first-axis; applying one or more low voltage excitation signals to the first first-axis excitation plate and to a second first-axis excitation plate; and detecting if the output voltage is higher than the predetermined threshold voltage. The first and second voltages may each be higher than a reference voltage. Applying the second voltage may further comprise alternately increasing and decreasing the second voltage to the first second-axis excitation plate. The method may further comprise determining that the first proof mass is stuck against the proof mass stop when the output voltage is higher than the threshold. Applying a first voltage to a first first-axis excitation plate may further comprise determining which proof mass stop of a plurality of proof mass stops the first proof mass is stuck against to determine the first first-axis excitation plate. The method may be performed on a MEMS device in the field. The method may further comprise a second proof mass arranged with the first proof mass to provide a differential output voltage.

In yet another embodiment, there is provided, a method for detecting and recovering from stiction in a multi-axis, single proof mass, micro-electro-mechanical system (MEMS) device, the method comprising: while operating in a normal operating mode, detecting that an output voltage from a first-axis direction of the MEMS device has been above a predetermined threshold voltage for a period of time greater than a predetermined time; adjusting an output amplifier for providing the output voltage to a relatively lower sensitivity setting; confirming that the output voltage indicates a first proof mass is stuck against a proof mass stop; applying a first voltage to a first first-axis excitation plate, wherein the first first-axis excitation plate is determined based on the detected output voltage; applying a second voltage to a first second-axis excitation plate while maintaining the first voltage to the first first-axis excitation plate, to move the first proof mass in a direction orthogonal to the first-axis; applying one or more low voltage excitation signals to the first first-axis excitation plate and to a second first-axis excitation plate, wherein the first and second voltages are higher than a reference voltage; and detecting if the output voltage is higher than the predetermined threshold voltage. The method may be performed in the field. The method may further comprise a second proof mass arranged with the first proof mass to provide a differential output voltage. Applying the second voltage may further comprise increasing and decreasing the second voltage to the first second-axis excitation plate.

FIG. 1 illustrates a simplified cross-sectional view of a multi-axis, single proof mass, micro-electro-mechanical system (MEMS) device 10 in accordance with an embodiment. MEMS device 10 includes substrate 12, bottom proof mass stops 20 and 22, top proof mass stops 24 and 26, fixed top plate 14, fixed bottom plate 16, and moveable plate 18. Moveable plate 18 is suspended to move in all three axis. The moveable plate is often referred to as a proof mass. Capacitors 28 and 30 represent capacitance between moveable plate 18 and fixed plates 14 and 16. Other components, such as the excitation plates and connection terminals, are not illustrated in FIG. 1. As a force moves moveable plate 18, such as acceleration or pressure, the capacitance values of capacitors 28 and 30 change with distance between the moveable plate 18 and fixed plates 14 and 16. An amplifier, not shown in FIG. 1, will sense the changing capacitance values and provide an output voltage on an axis corresponding to the amount of movement.

Figure 2:
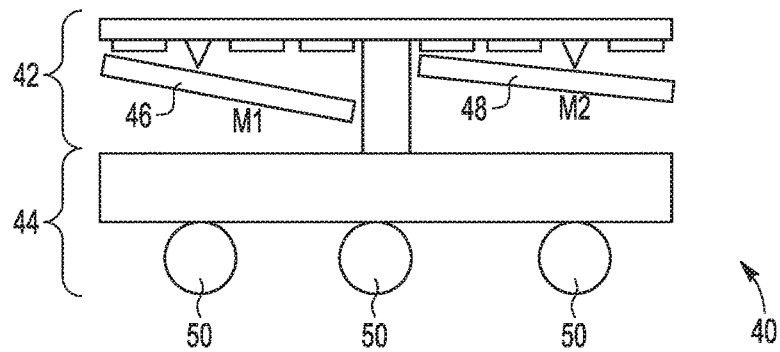
FIG. 2 illustrates a MEMS acceleration sensor having two multi-axis, single proof mass, devices as illustrated in FIG. 1.

FIG. 2 illustrates the MEMS acceleration sensor device 40 having two multi-axis, single proof mass, devices 46 and 48, each device similar to device 10 as illustrated in FIG. 1. The two devices 46 and 48 can be used for differential acceleration sensing to provide a differential output voltage. The use of differential voltage may be more sensitive to acceleration than using only one device. Sensor device 40 includes a MEMS portion 42 having the two devices 46 and 48 attached to an application specific integrated circuit (ASIC) portion 44. ASIC portion 44 includes the circuitry necessary for sensing the proof mass movements in devices 46 and 48 and providing the corresponding output voltages. The use of an ASIC in this way eliminates the need for external terminals to provide access to the MEMS devices. Therefore, device 40 only needs external terminals for a few functions including power, ground, a reference voltage, and the output voltage (for a sensor with analog outputs). As illustrated in FIG. 2, external terminals 50 may be solder balls, pins, or other connection type depending on the integrated circuit package technology and whether or not the output of the device is analog or digital. Solder balls are shown for illustration purposes only.

Figure 3:
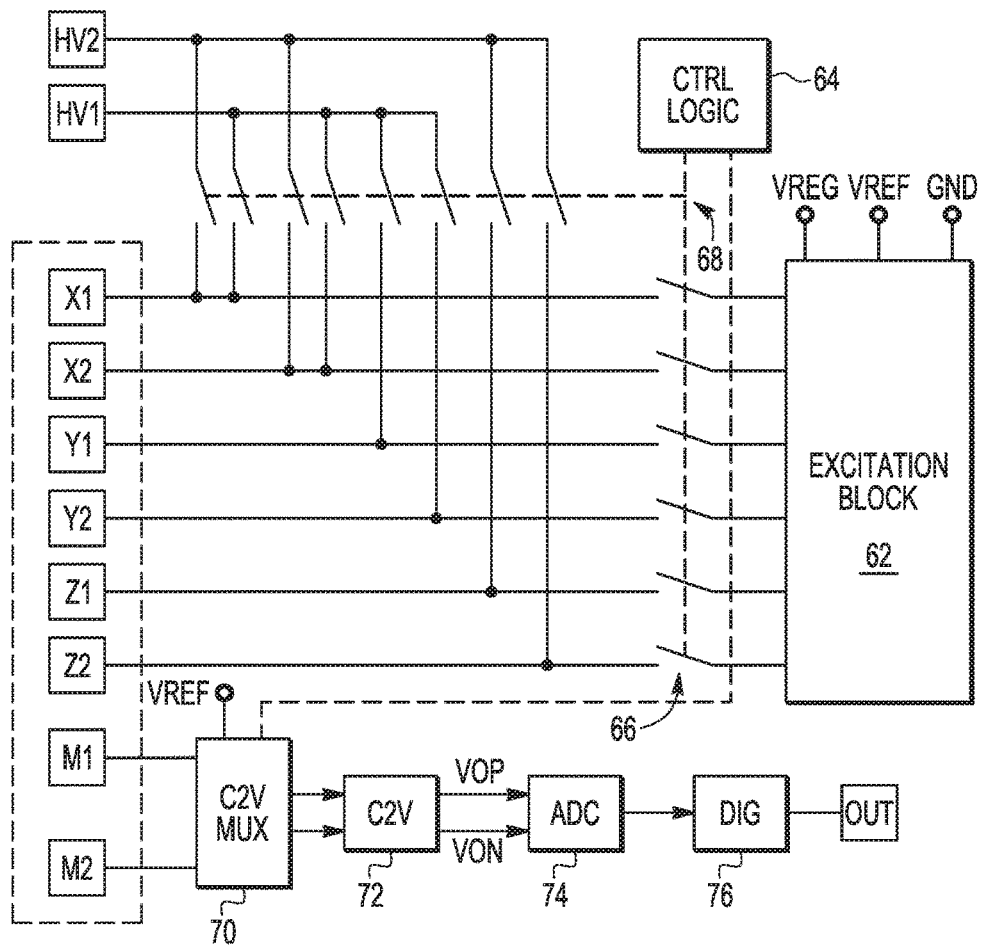
FIG. 3 illustrates a circuit for controlling the MEMS device in accordance with an embodiment.

FIG. 3 illustrates a circuit 60 for controlling the MEMS device in accordance with an embodiment. Circuit 60 may be implemented as, for example, an ASIC such as ASIC portion 44 in FIG. 2. Circuit 60 includes excitation block 62, control logic 64, capacitance-to-voltage (C2V) multiplexer 70, C2V converter 72, analog-to-digital converter (ADC) 74, and digital logic 76. A first plurality of switches 66 and a second plurality of switches 68 provide a multiplexing function between low voltage excitation terminals of block 62 (for reading MEMS capacitances) and first and second high voltage terminals HV1 and HV2, respectively, with a MEMS device as illustrated in FIG. 2.

In circuit 60, C2V multiplexer 70 has a first input connected to a terminal M1 for proof mass 46 a terminal M2 connected to proof mass 48, and first and second output terminals for providing a differential signal. Control signals are received by C2V multiplexer from control logic 64. C2V multiplexer 70 is also coupled to receive a reference voltage VREF. In one embodiment, excitation block 62 and C2V multiplexer 70 receive the same reference voltage. C2V converter 72 has first and second input terminals connected to the first and second output terminals of C2V multiplexer 70, and first and second output terminals for providing differential output signals VOP and VON. ADC 74 has first and second inputs connected to the first and second outputs of C2V converter 72, and an output terminal. Digital logic 76 has an input connected to the output of ADC 74, and an output connected to an output terminal OUT.

Excitation block 62 has a power supply terminal for receiving regulated power supply voltage VREG, a reference voltage terminal for receiving a reference voltage, and a ground terminal connected to ground. Generally, reference voltage VREF may be between VREG and ground. More specifically, reference voltage VREF is one-half of VREG. Excitation block has a plurality of terminals; each terminal of the plurality of terminals is connected to a switch of the first plurality of switches 66. Another terminal of each of the plurality of switches is connected to an excitation plate terminal. Each of proof masses 46 and 48 have an x-axis, a y-axis, and a z-axis. There is a terminal for connecting to each of the excitation plates for each of the x-axis, y-axis, and z-axis for both of proof masses 46 and 48 labeled X1, X2, Y1, Y2, Z1, and Z2. High voltages can be selectively provided to each of the excitation plates via the plurality of switches 68 as controlled by control logic 64. For example, a first high voltage may be provided via terminal HV1 to each of terminals X1, X2, Y1, and Y2, through the appropriate one of the plurality of switches 68. Likewise, a second high voltage can be provided to each of terminals X1, X2, Z1, and Z2 through the appropriate one of the plurality of switches 68.

Figure 4:
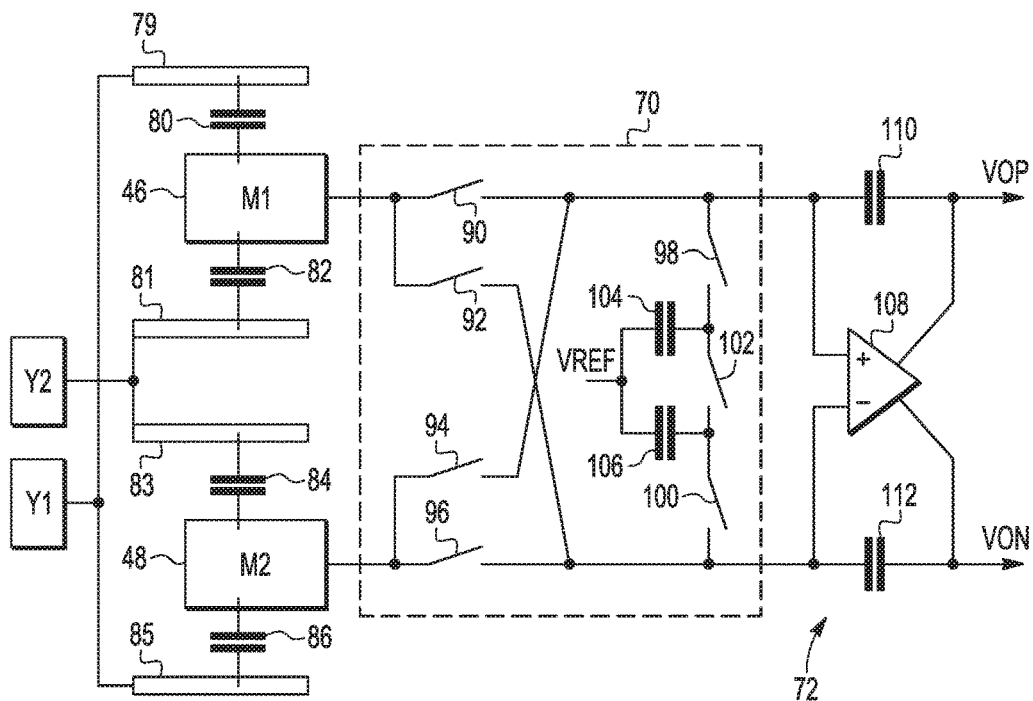
FIG. 4 illustrates a portion of the circuit of FIG. 4 in more detail.

FIG. 4 illustrates a portion of the circuit of FIG. 4 in more detail. The portion illustrated in FIG. 4 shows C2V multiplexer 70 in more detail and connected to proof masses 46 and 48. Excitation plates 79 and 81 are associated with proof mass 46 and excitation plates 83 and 85 are associated with proof mass 48. Capacitors 80 and 82 illustrate the capacitance between proof mass 46 and excitation plates 79 and 81, respectively. Capacitors 84 and 86 illustrate the capacitance between proof mass 48 and excitation plates 83 and 85, respectively. C2V multiplexer 70 includes switches 90, 92, 94, 96, 98, 100, and 102, and capacitors 104 and 106. C2V converter, or amplifier, 72 includes an operational amplifier 108 and capacitors 110 and 112. C2V converter 72 functions as a detector, or sense amplifier for sensing and amplifying the relatively small signals provided the MEMS device.

In C2V multiplexer 70, switch 90 has a first terminal connected to proof mass 46, a second terminal, and a control terminal (not shown) for receiving a control signal from control logic 64 as illustrated in FIG. 3. Note that none of the switch control terminals are illustrated in FIG. 4 for simplicity and clarity. Switch 96 has a first terminal connected to proof mass 48, a control terminal, and a second terminal. Switch 92 has a first terminal connected to proof mass 46, and a second terminal connected to the second terminal of switch 96. Switch 94 has a first terminal connected to proof mass 48, and a second terminal connected to the second terminal of switch 90. Switch 98 as a first terminal connected to the second terminal of switch 90, a control terminal, and a second terminal. Switch 100 has a first terminal connected to the second terminal of switch 96, a control terminal, and a second terminal. Switch 102 has a first terminal connected to the second terminal of switch 98, a control terminal, and a second terminal connected to the second terminal of switch 100. Capacitor 104 has a first terminal coupled to receive reference voltage VREF, and a second terminal connected to the second terminal of switch 98. Capacitor 106 has a first terminal coupled to receive reference voltage VREF, and a second terminal connected to the second terminal of switch 100.

Operational amplifier 108 has a first input terminal labeled with a plus sign (+) connected to the second terminal of switch 90, a second input terminal labeled with a minus sign (−) connected to the second terminal of switch 96, a first output terminal labeled VOP, and a second output terminal labeled VON. In one embodiment, VOP and VON are characterized as being differential output signals. Capacitor 110 has a first terminal connected to the first input terminal of amplifier 108, and a second terminal connected to the first output terminal of amplifier 108. Capacitor 112 has a first terminal connected to the second input terminal of amplifier 108, and a second terminal connected to the second output terminal of amplifier 108.

Figure 5:
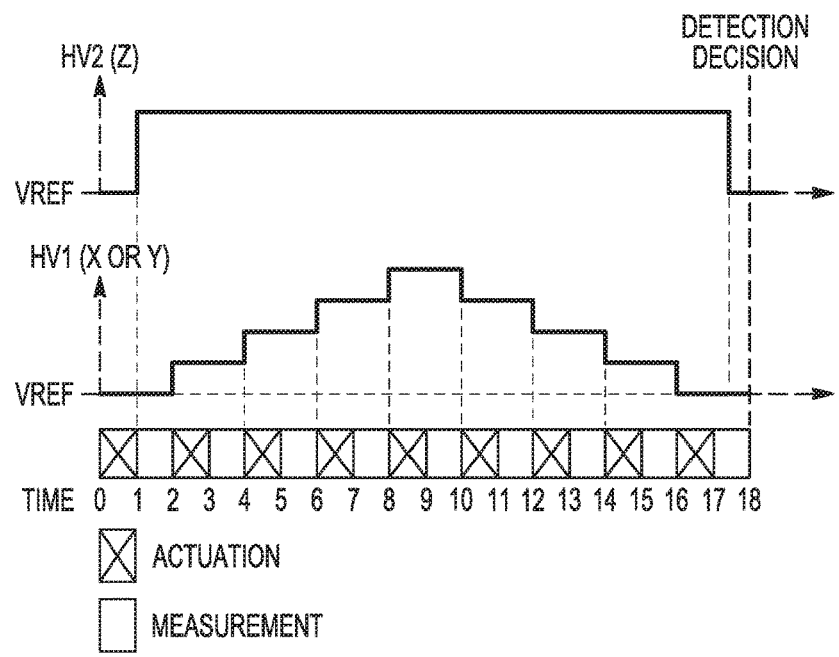
FIG. 5 illustrates a waveform for producing an orthogonal motion in the proof mass in accordance with an embodiment.

FIG. 5 illustrates a waveform for producing an orthogonal motion in the proof mass in accordance with an embodiment. During one of the test modes as described below, a high voltage HV2 is applied to a z-axis excitation plate between time units 1 and 17. The high voltage pulls the proof mass into contact with the proof mass stop. While against the stop, another high voltage HV1 ramps up and down between time units 1 and 17 in a direction orthogonal to the z-axis, such as the x or y-axis. Ramping the voltage is intended to cause the proof mass to rub or scrap back and forth against the stop. The back and forth force is intended to either enhance the possibility of stiction to occur, or to help recovery from stiction, depending on the test mode. Note that because the excitation plates are used for both moving the proof mass and measuring movement, the time periods are divided between a measurement phase and an excitation phase as illustrated. The unit of time illustrated in FIG. 5 may be, for example, milliseconds.

In one embodiment, during a test mode, an actuation phase alternates with a measurement phase. During the actuation phase, all MEMS excitation electrodes are held to reference voltage VREF except for two of the excitation electrodes used for orthogonal movement of the proof mass. For example, excitation electrodes X2, Y1, Y2, and Z2 may be held at reference voltage VREF while Z1 is pulled to HV2 to pull the proof mass to the stop in the desired direction to test for stiction, and X1 is pulled to HV1 to move the proof mass in a direction orthogonal to the direction being tested for stiction. Then, during the measurement phase, all of the MEMS excitation electrodes are held to VREF except the two that correspond to the axis for which the MEMS capacitances are to be measured. To measure the displacement of the mass along the Z direction, excitation electrodes Z1 and Z2 are excited with low voltage signals during the measurement phase. Note that in another embodiment, a voltage lower than high voltages HV1 or HV2 may be used to displace the proof mass, such as for example, 2×VREF.

Figure 6:
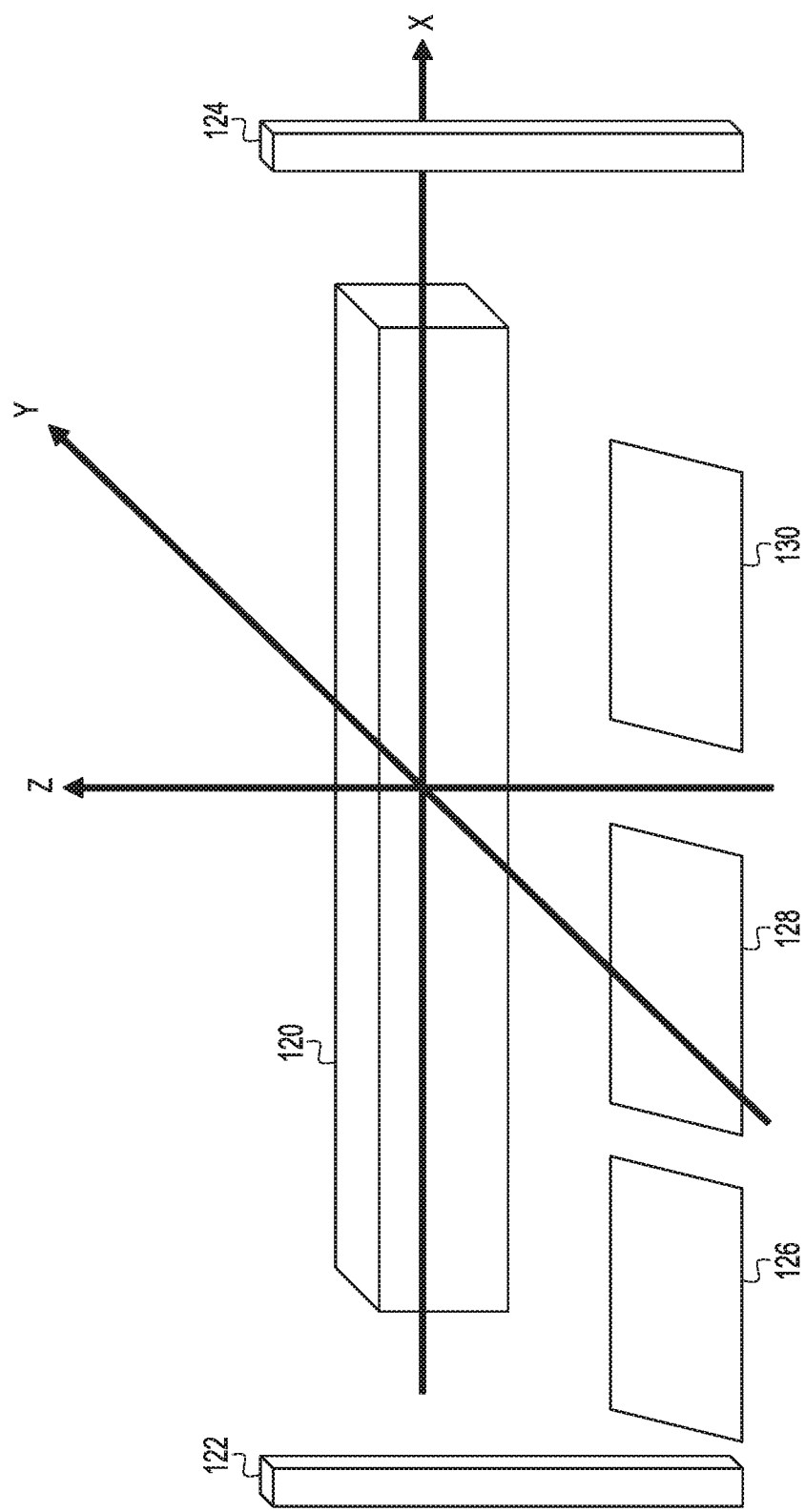
FIG. 6 and FIG. 7 illustrate a conceptual depiction of movement of a three axis single proof mass in accordance with an embodiment.
Figure 7:
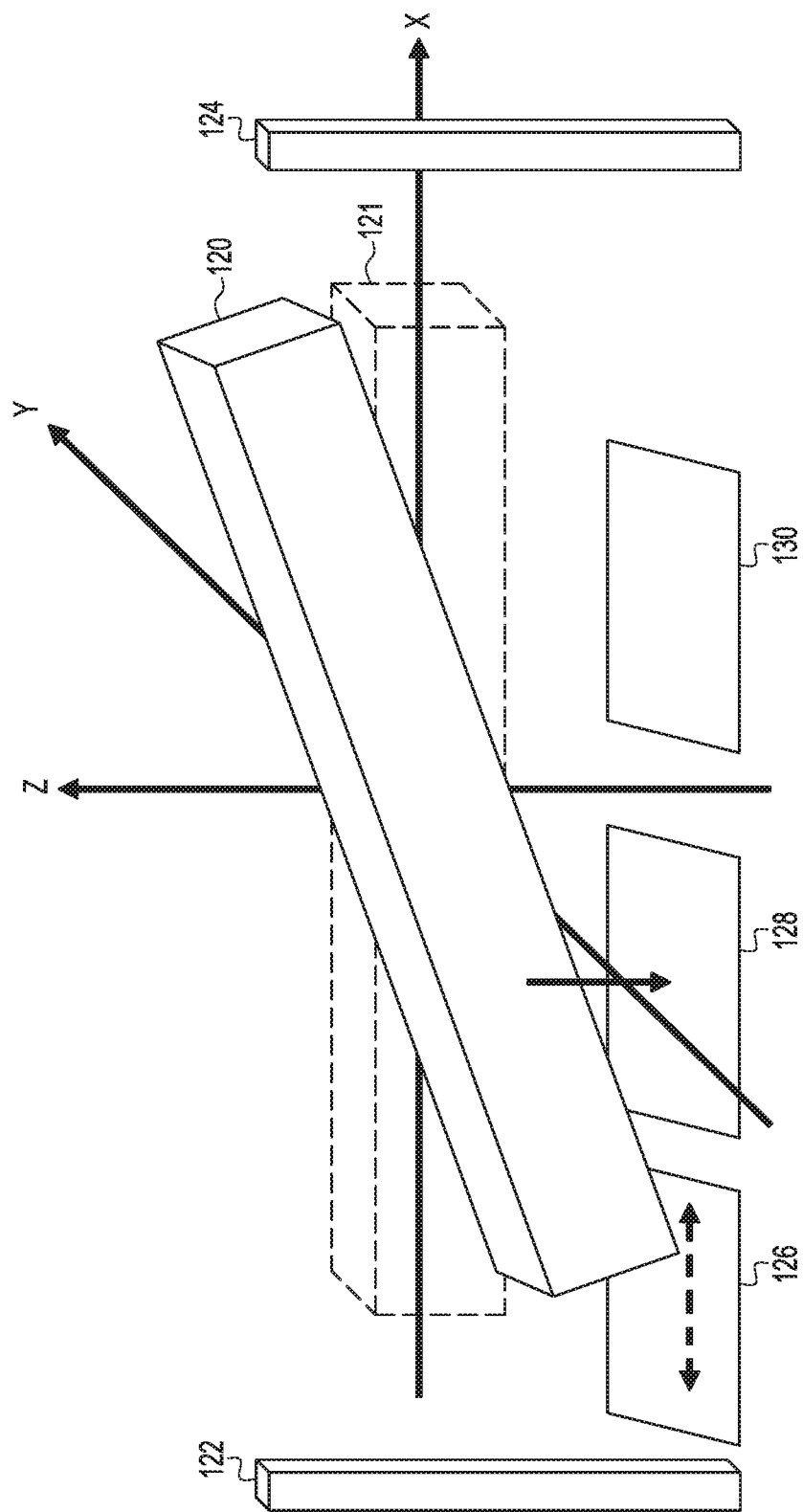

FIG. 6 and FIG. 7 illustrate a conceptual depiction of movement of a three axis single proof mass in accordance with an embodiment. In FIG. 6 the three axis are illustrated two dimensionally. The x-axis extends horizontally, from left to right, in the plane of the drawing. The z-axis extends vertically, up and down, in the plane of the drawings. The y-axis extends orthogonally to the plane of the drawing. A proof mass 120 is shown positioned on a fulcrum (not shown) as a beam in the x-axis. A z-axis stop plate 126 is shown under one end of the proof mass 120. An x-axis excitation plate 122 is connected to terminal X1 (FIG. 3), and a second x-axis excitation plate 124 is connected to terminal X2 (FIG. 3). A z-axis excitation plate 128 is connected to terminal Z1 and a z-axis excitation plate 130 is connected to terminal Z2.

Figure 8:
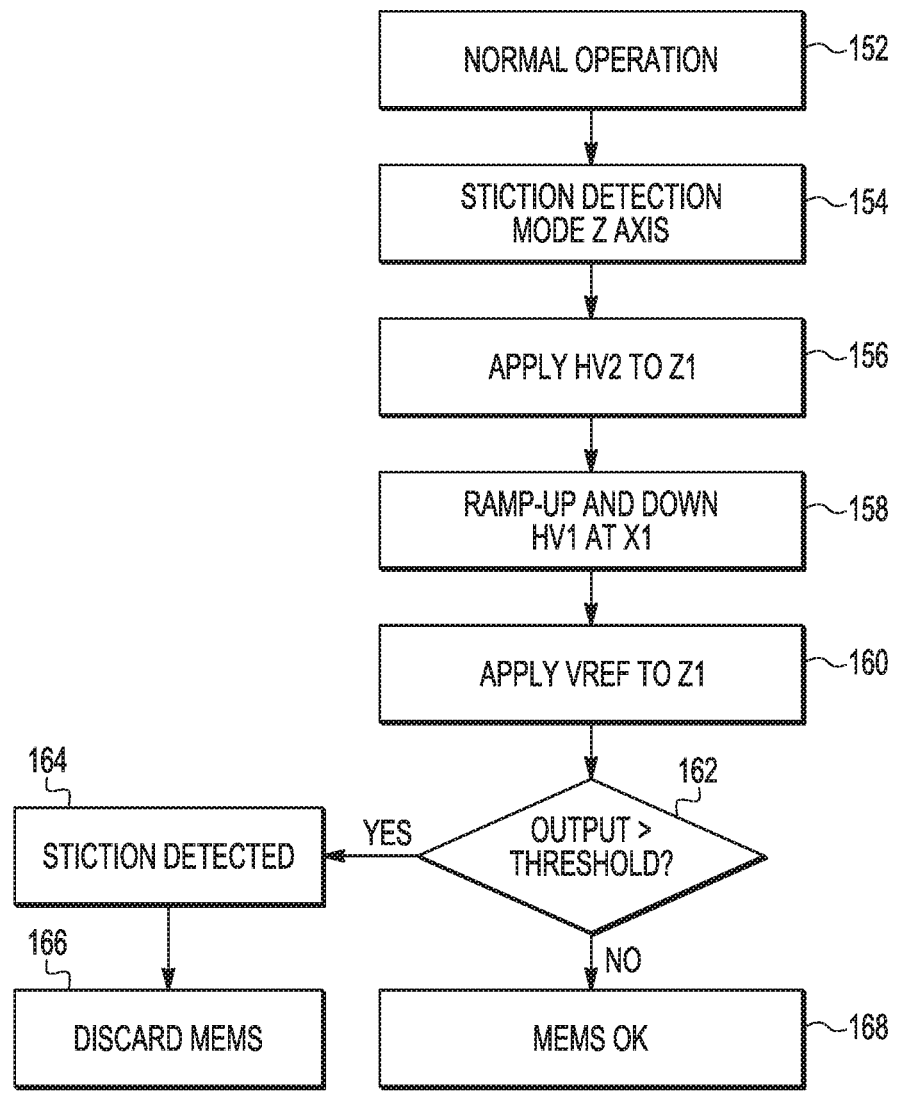
FIG. 8 illustrates a method for detecting stiction in accordance with an embodiment.

FIG. 8 illustrates a method 150 for detecting stiction in accordance with an embodiment. From a normal operating mode 152, a stiction detection mode may be entered. Note that in another embodiment, a stiction detection mode may be entered at startup. At step 154, the stiction detection mode is entered for testing stiction in the z-axis. In another embodiment, stiction could be tested for in a different axis. During a normal mode, movement of the proof mass is detected by measuring capacitance between the proof mass and the excitation plates. During the test mode, the excitation plates are also used to move the proof mass. To move the proof mass, a high voltage is applied to the excitation plates for the direction of desired movement. For example, to move the proof mass in the z-axis direction, at step 156, a high voltage at terminal HV2 in FIG. 3 is provided by one of the second plurality of switches 68 to either terminal Z1 or Z2 depending on which direction the proof mass is to move. In the illustrated example of FIG. 7, the high voltage from HV2 is provided to terminal Z1, to cause the end of proof mass 120 to come in contact with stop 126. The application of HV2 to excitation plate Z1 is illustrated in FIG. 5. Movement of the proof mass to the stop will cause the maximum voltage to be output at terminal OUT (FIG. 3). To improve the chance that stiction will cause the proof mass to stick against stop 126, at step 158, another high voltage from terminal HV1 is alternately applied to an axis orthogonal to the z-axis to cause the portion of the proof mass 120 contacting stop 126 to "rub" against the stop. In the illustrated embodiment, the high voltage from HV1 is applied to one of x-axis excitation plates 122 or 124 and ramped up and down in voltage level as illustrated in FIG. 5 to cause the portion of proof mass 120 contacting stop 126 to move back and forth in the x-axis. The movement in the x-axis is intended to increase the possibility that stiction will occur. In another embodiment, movement in the y-axis may be used. At step 160, the high voltage from terminal HV2 is removed from Z1 and reference voltage VREF is applied to terminal Z1. This will allow the spring force in proof mass 120 to move proof mass 120 back to its neutral position. At decision step 162 it is determined if the high output voltage at terminal OUT is still present by comparing the high output voltage to a threshold voltage. If output OUT is not greater than the threshold voltage, then stiction did not occur and the NO path is taken to step 168. At step 168, the MEMS device passes the test. However, if the output voltage OUT is greater than the threshold voltage, then the YES path is taken to step 164, and stiction has been detected. The MEMS device failed the test and the MEMS device is discarded at step 166.

Figure 9:
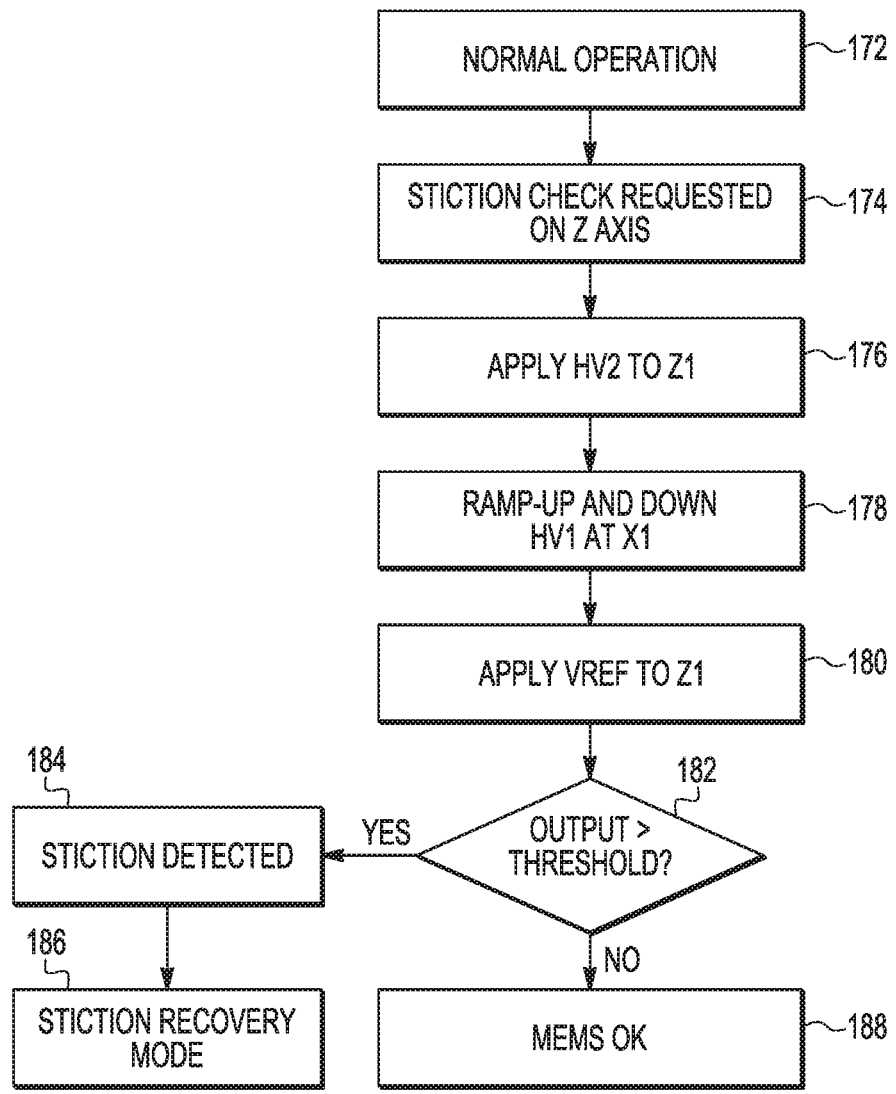
FIG. 9 illustrates a method for detecting and recovering from stiction in accordance with an embodiment.

FIG. 9 illustrates a method 170 for detecting and recovering from stiction in accordance with an embodiment. From a normal operating mode 172, a stiction detection mode may be entered. Note that in another embodiment, a stiction detection mode may be entered at startup. At step 174, the stiction detection mode is entered for testing stiction in the z-axis. In another embodiment, stiction could be testing for a different axis. During a normal mode, movement of the proof mass is detected by measuring capacitance between the proof mass and the excitation plates. During the test mode, the excitation plates are also used to move the proof mass. To move the proof mass, a high voltage is applied to the excitation plates for the direction of desired movement. For example, to move the proof mass in the z-axis direction, at step 176, a high voltage at terminal HV2 in FIG. 3 is provided by one of the second plurality of switches 68 to either terminal Z1 or Z2 depending on which direction proof mass is to move. In the illustrated example of FIG. 7, the high voltage from HV2 is provided to terminal Z1, to cause the end of proof mass 120 to come in contact with stop 126. The application of HV2 to excitation plate Z1 is illustrated in FIG. 5. Movement of the proof mass to the stop will cause the maximum voltage to be output at terminal OUT (FIG. 3). To maximize the chance that stiction will occur with stop 126, at step 178, another high voltage from terminal HV1 is alternately applied to an axis orthogonal to the z-axis to cause the portion of the proof mass 120 contacting stop 126 to "rub" against the stop. In the illustrated embodiment, the high voltage from HV1 is applied to one of x-axis excitation plates 122 or 124 and ramped up and down in voltage level as illustrated in FIG. 5 to cause the portion of proof mass 120 contacting stop 126 to move back and forth in the x-axis. The movement in the x-axis is intended to increase the possibility that stiction will occur. In another embodiment, movement in the y-axis may be used. At step 180, the high voltage from terminal HV2 is removed from Z1 and reference voltage VREF is applied to terminal Z1. This will allow the spring force in proof mass 120 to move proof mass 120 back to its neutral position. At decision step 182 it is determined if the high output voltage at terminal OUT is still present by comparing the high output voltage to a threshold voltage. If output OUT is not greater than the threshold voltage, then stiction did not occur and the NO path is taken to step 188. At step 188, the MEMS device passes the test. However, if the output voltage OUT is greater than the threshold voltage, then the YES path is taken to step 184, and stiction has been detected. At step 186, a stiction recovery mode is entered. Under certain circumstances, it may not be desirable to discard the MEMS device is stiction is detected. Instead, in accordance with an embodiment, a stiction recovery mode is entered where a high voltage is provided to the z-axis to help the proof mass return spring to pull the proof mass away from the stop. At the same time, another high voltage is alternately applied in a direction orthogonal to the z-axis to cause the proof mass to move from side-to-side. The application of the two high voltage in directions orthogonal to each other is intended to help the proof mass to recover from the stiction condition.

Figure 10:
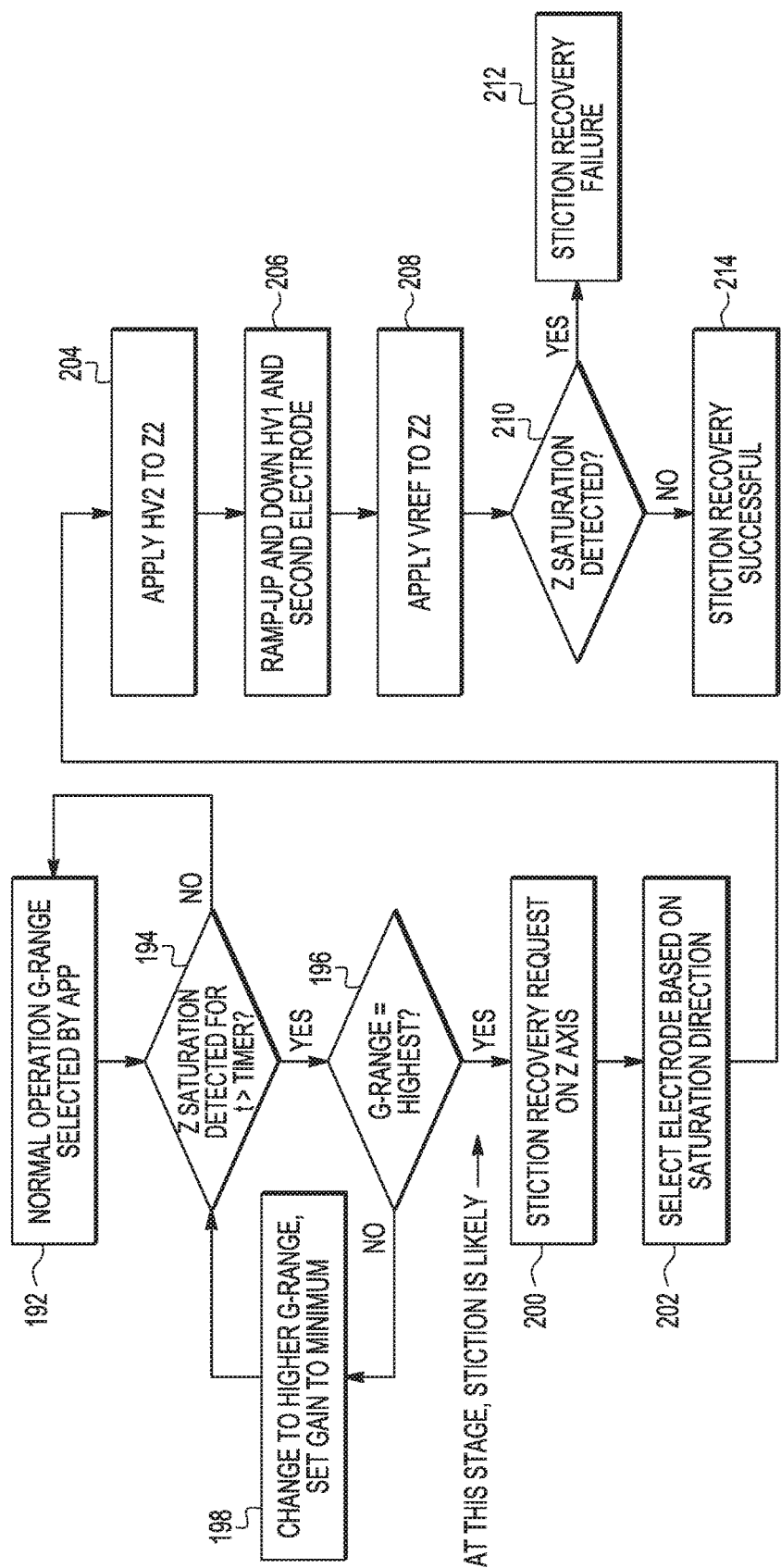
FIG. 10 illustrates a method for detecting and recovering from stiction in accordance with another embodiment.

FIG. 10 illustrates a method 190 for detecting and recovering from stiction in a MEMS device in accordance with another embodiment. In one embodiment, method 190 may be performed when the MEMS device is operating in an application in the field, for example, in a high reliability application such as in an automobile. At step 192, a gain is selected for the C2V amplifier 72. Applying a high gain to the C2V amplifier will cause the amplifier to be more sensitive to proof mass movement. A lower gain will cause the amplifier to be less sensitive to proof mass movement. At decision step 194, it is determined if a saturation voltage is detected for, for example, the z-axis for a predetermined length of time. If no, the NO path returns to step 192. The saturation voltage is the highest voltage allowed for the device. The saturation voltage may be detected by comparing the output voltage at terminal OUT to a threshold voltage. If at decision step 194, a saturation voltage is detected for a predetermined length of time, then stiction is a possibility, and the YES path is taken to step 196. At decision step 196, it is determined if the amplifier gain for C2V amplifier 72 is set for full scale range, that is, lowest sensitivity. If no, the NO path is taken to step 198 and the gain is set to minimum gain, or lowest amplifier sensitivity. The test is repeated at decision step 194. If saturation voltage is not detected, then no stiction and normal operation resumes at step 192. If at decision step 194, saturation voltage is still present, then stiction is assumed and the YES path is taken to back to step 196. The gain is at the lowest sensitivity, or highest g-range, and the method continues to step 200 where stiction recovery proceeds on the axis on which it was detected, the z-axis in this case. At step 202, an excitation plate (or electrode) is selected to be in a direction opposite to the direction stiction was detected. As an example, electrode Z2 will be chosen. At step 204, a high voltage from terminal HV2 is applied to the excitation electrode connected to terminal Z2. At step 206, a second high voltage from terminal HV1 is applied to a terminal in a direction orthogonal to the z-axis, either x or y-axis. The HV1 voltage is ramped up and down to cause the sliding motion across the stop to release the stiction. At step 208, the high voltages are removed, and reference voltage VREF is applied. At decision step 210, It is determined if the saturation voltage is still detected. If yes, the YES path is taken to step 212 and the MEMS device failed. If at decision step 210, it is determined that the saturation voltage is no longer detected, then recovery was successful, and the NO path is taken to step 214.

During a normal sensing operation, low voltage excitation signals are applied to excitation electrodes of the MEMS. These low voltage excitation signals comprise signals switching from reference voltage VREF to 2×VREF, which may be provided at the VREG terminal illustrated on block 62 of FIG. 3, or ground. Opposite excitation electrodes, e.g. X1 and X2, are driven with complementary signals. For example, when X1 rises from VREF to VREG, X2 falls from VREF to ground. This complementary and symmetrical voltage excitation creates charge transfer in the MEMS, thereby allowing measurement of the MEMS capacitances without creating net electrostatic forces that would change the mobile mass position. The net electrostatic forces on the proof mass is avoided because the low voltage excitation creates two electrostatic forces of equal magnitude and direction but of opposite sense. In some applications, the voltage VREF may be 0.8 V or 1.0 V, but this will depend on the particular MEMS sensor and the power supply voltage. The proof masses 46 and 48 are normally also at the reference voltage VREF due to their connections through C2V multiplexer 72. In some embodiments, C2V converter 70 may include additional components, such as resistors, for causing the input terminals of amplifier 108 and hence the proof masses to be at a voltage equal to the reference voltage VREF.

According to an embodiment there is provided a method for detecting and recovering from stiction in a multi-axis, single proof mass, micro-electro-mechanical system (MEMS) device, the method comprising:

while operating in a normal operating mode, detecting that an output voltage from a first-axis direction of the MEMS device has been above a predetermined threshold voltage for a period of time greater than a predetermined time;

adjusting an output amplifier for providing the output voltage to a relatively lower sensitivity setting;

confirming that the output voltage indicates a first proof mass is stuck against a proof mass stop;

applying a first voltage to a first first-axis excitation plate, wherein the first first-axis excitation plate is determined based on the detected output voltage;

applying a second voltage to a first second-axis excitation plate while maintaining the first voltage to the first first-axis excitation plate, to move the first proof mass in a direction orthogonal to the first-axis;

applying one or more low voltage excitation signals to the first first-axis excitation plate and to a second first-axis excitation plate, wherein the first and second voltages are higher than a reference voltage; and detecting if the output voltage is higher than the predetermined threshold voltage.

The method may be performed in the field.

A second proof mass may be arranged with the first proof mass to provide a differential output voltage.

Applying the second voltage further comprises increasing and decreasing the second voltage to the first second-axis excitation plate.

In an implementation having an ASIC bonded to the MEMS devices, the terminals for accessing the MEMS device may no longer be accessible. In this case, a software routine may be loaded onto memory (not shown) in the ASIC to perform the described methods for detecting and recovering from stiction. The routine may be preloaded, or may be loaded through a serial input port in the ASIC (not shown).

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for testing a multi-axis, micro-electro-mechanical system (MEMS) acceleration sensor, the method comprising:

applying a first voltage to a first-axis excitation plate to move a first proof mass in contact with a proof mass stop;

applying a second voltage to a second-axis excitation plate while maintaining the first voltage to the first-axis excitation plate, to move the first proof mass in a direction orthogonal to the first-axis while in contact with the proof mass stop;

applying a reference voltage to the first-axis excitation plate; and detecting if an output voltage of the MEMS device is higher than a threshold voltage.

2. The method of claim 1, wherein applying the second voltage further comprises alternately increasing and decreasing the second voltage to the second-axis excitation plate.

3. The method of claim 1, wherein the method for testing further comprises detecting that the first proof mass is stuck against the proof mass stop when the output voltage is higher than the threshold.

4. The method of claim 3, wherein the method for testing further comprises recovering the first proof mass from being stuck, wherein recovering further comprising:
   determining which proof mass stop of a plurality of proof mass stops the first proof mass is stuck against;
   applying the first voltage to an excitation plate in a first-axis direction opposite the proof mass stop the first proof mass is stuck against;
   applying the second voltage to an excitation plate in a second-axis direction orthogonal to the first-axis direction; and
detecting if the first proof mass is still stuck against the proof mass stop.

5. The method of claim 1, wherein the MEMS device is a three-axis, single proof mass, MEMS device.

6. The method of claim 1, wherein the first voltage and the second voltage are each higher than the reference voltage.

7. The method of claim 1, further comprising alternating the steps of applying the first voltage and applying the reference voltage.

8. The method of claim 1, further comprising a second proof mass arranged with the first proof mass to provide a differential output voltage.

9. The method of claim 1, wherein the method is performed during manufacture of the MEMS device.

10. A method for detecting and recovering from stiction in a multi-axis, single proof mass, micro-electro-mechanical system (MEMS) device, the method comprising:
    detecting that an output voltage from a first-axis direction of the MEMS device has been above a predetermined threshold voltage for a period of time greater than a predetermined time;
    applying a first voltage to a first first-axis excitation plate, wherein the first first-axis excitation plate is determined based on the saturation output voltage;
    applying a second voltage to a first second-axis excitation plate while maintaining the first voltage to the first first-axis excitation plate, to move a first proof mass in a direction orthogonal to the first-axis;
    applying one or more low voltage excitation signals to the first first-axis excitation plate and to a second first-axis excitation plate; and
    detecting if the output voltage is higher than the predetermined threshold voltage.

11. The method of claim 10, wherein the first and second voltages are each higher than a reference voltage.

12. The method of claim 10, wherein applying the second voltage further comprises alternately increasing and decreasing the second voltage to the first second-axis excitation plate.

13. The method of claim 10, further comprising determining that the first proof mass is stuck against the proof mass stop when the output voltage is higher than the threshold.

14. The method of claim 10, wherein applying a first voltage to a first first-axis excitation plate further comprises determining which proof mass stop of a plurality of proof mass stops the first proof mass is stuck against to determine the first first-axis excitation plate.

15. The method of claim 10, wherein the method is performed on a MEMS device in the field.

16. The method of claim 10, further comprising a second proof mass arranged with the first proof mass to provide a differential output voltage.

17. A method for detecting and recovering from stiction in a multi-axis, single proof mass, micro-electro-mechanical system (MEMS) device, the method comprising:
    while operating in a normal operating mode, detecting that an output voltage from a first-axis direction of the MEMS device has been above a predetermined threshold voltage for a period of time greater than a predetermined time;
    adjusting an output amplifier for providing the output voltage to a relatively lower sensitivity setting;
    confirming that the output voltage indicates a first proof mass is stuck against a proof mass stop;
    applying a first voltage to a first first-axis excitation plate, wherein the first first-axis excitation plate is determined based on the detected output voltage;
    applying a second voltage to a first second-axis excitation plate while maintaining the first voltage to the first first-axis excitation plate, to move the first proof mass in a direction orthogonal to the first-axis;
    applying one or more low voltage excitation signals to the first first-axis excitation plate and to a second first-axis excitation plate, wherein the first and second voltages are higher than a reference voltage; and
    detecting if the output voltage is higher than the predetermined threshold voltage.

18. The method of claim 17, wherein the method is performed in the field.

19. The method of claim 17, further comprising a second proof mass arranged with the first proof mass to provide a differential output voltage.

20. The method of claim 17, wherein applying the second voltage further comprises increasing and decreasing the second voltage to the first second-axis excitation plate.

* * * * *